(12) United States Patent
Furuta

(10) Patent No.: US 8,054,418 B2
(45) Date of Patent: Nov. 8, 2011

(54) LCD APPARATUS

(75) Inventor: Yoshihiro Furuta, Neyagawa (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 12/566,821

(22) Filed: Sep. 25, 2009

(65) Prior Publication Data

US 2010/0079687 A1    Apr. 1, 2010

(30) Foreign Application Priority Data

Sep. 29, 2008   (JP) ................................. 2008-249990

(51) Int. Cl.
*G02F 1/1335* (2006.01)

(52) U.S. Cl. .............................................. 349/96; 349/5

(58) Field of Classification Search .................. 349/5, 96
See application file for complete search history.

(56) References Cited

U.S. PATENT DOCUMENTS

| | | | |
|---|---|---|---|
| 6,669,343 B2* | 12/2003 | Shahzad et al. | 353/20 |
| 7,057,681 B2* | 6/2006 | Hinata et al. | 349/96 |
| 2007/0051057 A1* | 3/2007 | Zakoji et al. | 52/171.3 |

FOREIGN PATENT DOCUMENTS

| | | |
|---|---|---|
| JP | 2000-356770 A | 12/2000 |
| JP | 2006-039087 A | 2/2006 |
| JP | 2008-102416 A | 5/2008 |

* cited by examiner

*Primary Examiner* — Eric Wong
(74) *Attorney, Agent, or Firm* — Westerman, Hattori, Daniels & Adrian, LLP

(57) ABSTRACT

An LCD apparatus includes LCD panels for modulating irradiated light based on picture signals, a projection lens for extendedly projecting the light modulated by the LCD panels, a light source for emitting light to irradiate the LCD panels, an inorganic polarizer having a relatively higher degree of polarization and disposed on a light-emission side of each of the LCD panels, and an absorptive polarizer having a lower degree of polarization than the inorganic polarizer and disposed on a light-emission side of the inorganic polarizer. The inorganic polarizer having the higher degree of polarization and the absorptive polarizer having the lower degree of polarization have respective light transmission axes coincident with each other.

8 Claims, 3 Drawing Sheets

LCD APPARATUS

BACKGROUND OF THE INVENTION

1. Field of the Invention

The present invention relates to a projection type liquid crystal display (LCD) apparatus and particularly to an LCD unit.

2. Description of the Prior Art

In recent years, optical lifetime of LCD panels and polarizers has become an important factor in proportion as projection type LCD apparatus have been required to have higher brightness and higher contrast. Particularly, when polarizer films (absorptive organic polarizers) have been exposed to intense short-wavelength light in the blue band, they have possibly been burnt by the light. To cope with this problem, there have been developed inorganic polarizers, a typical one of which is a wire grid polarizer manufactured by MOXTEK, Inc. This polarizer is a so-called reflective polarizer that allows transmission of light polarized only in a particular direction and reflects the rest of the light. For this reason, the polarizer has little suffered time degradation due to light irradiation and been used in a projection type LCD utilized for a rear projection TV requiring a longer operating life.

JP-A 2000-356770 discloses an LCD panel provided on the light-incidence side thereof with an absorptive polarizer that is equipped on the light-incidence side thereof with a reflective polarizer.

On the other hand, on the light-emission side of the LCD panel, almost all light that has failed to be transmissive relative to the reflective polarizer, of the light that has been transmissive relative to the LCD panel, is reflected onto the LCD panel when the reflective polarizer has been used without modification. As a result, since a photo-leakage current of a TFT that is a drive element for the LCD panel and polarization disturbance due to multiple reflection of light are induced to obtain an image having insufficient contrast, in general, the reflective polarizer is not used on the light-emission side of the LCD panel. Though it is possible to use the reflective polarizer if the reflective polarizer is disposed at an angle of 45° relative to an optical axis and if an optical configuration in which reflected light is not returned to the LCD panel is adopted, it is necessary to take measures for coping with a large-sized set of complicated configuration and treating unwanted light.

For this reason, as described with reference to FIG. 10 in paragraph [0052] of JP-A 2008-102416, for example, a wire grid is provided on the surface thereof with a light-absorbing layer to form an absorptive polarizer that has come to be used on the light-emission side of an LCD panel.

However, since use of the inorganic polarizer on the light-emission side of the LCD panel causes the degree of polarization to be low as compared with use of the conventional absorptive organic (film) polarizer, the degradation of contrast is induced. Furthermore, in the case of a reflective inorganic polarizer, the light reflected by the polarizer onto the LCD panel as described above and reflected by a metallic thin film that is incorporated into the LCD panel to form a black matrix is irradiated again onto the inorganic polarizer, repeats multiple reflection of light several times and finally enters as unwanted light into the image to be displayed to induce some irregular linear patterns as shown in FIG. 3, thereby deteriorating the picture quality. Incidentally, in FIG. 3, for making it easy to understand where the irregular linear patterns have been induced, a picture-quality black display screen is shown by a gray color to emphatically show the irregular linear patterns. Particularly in the case where an optical compensator is disposed on the light-incidence side of the LCD panel for the purpose of enhancing the contrast or the case where a reflective polarizer is installed on the light-incidence side of the LCD panel, the multiple reflections of light are superposed to considerably deteriorate the picture quality.

In addition, even when the wire grid is provided on the surface thereof with the light-absorbing layer to form the absorptive polarizer, as described above, multiple reflection of light is induced due to a variation in performance of the light-absorbing layer. Empirically, the picture quality is significantly deteriorated if the reflectance is 10% or more.

The present invention has been accomplished in order to solve the problems mentioned above, and the object thereof is to provide an LCD apparatus capable of eliminating the reduction of contrast due to the insufficient degree of polarization of an inorganic polarizer and further eliminating the degradation of a picture quality due to multiple reflection of unwanted light.

SUMMARY OF THE INVENTION

To attain the above object, the present invention provides an LCD apparatus comprising LCD panels for modulating irradiated light based on picture signals, a projection lens for extendedly projecting the light modulated by the LCD panels, a light source for emitting light to irradiate the LCD panels, an inorganic polarizer having a relatively higher degree of polarization and disposed on a light-emission side of each of the LCD panels, and an absorptive polarizer having a lower degree of polarization than the inorganic polarizer and disposed on a light-emission side of the inorganic polarizer, wherein the inorganic polarizer having the higher degree of polarization and the absorptive polarizer having the lower degree of polarization have respective light transmission axes coincident with each other.

By disposing the inorganic polarizer having the relatively higher degree of polarization and the absorptive polarizer having the lower degree of polarization than the inorganic polarizer on the light-emission side of the LCD panels in the order mentioned so that their respective light transmission axes may be coincident with each other, as described above, since contrast depends on a product of the degrees of polarization of the two polarizers, it is possible to eliminate the reduction of contrast due to the insufficient degree of polarization of the inorganic polarizer and simultaneously eliminate the degradation of a picture quality due to multiple reflection of unwanted light on the surface of the inorganic polarizer as a consequence of absorption of unwanted reflected light by the absorptive polarizer having the lower degree of polarization.

Furthermore, the inorganic polarizer having the higher degree of polarization preferably comprises an absorptive polarizer.

In addition, though the absorptive polarizer having the lower degree of polarization may be made of an inorganic substance, that made of an organic substance may be used because the degree of polarization thereof is made lower to absorb unwanted polarization, thereby enabling heat to be suppressed from generation.

Furthermore, at least one of the inorganic polarizer having the higher degree of polarization and the absorptive polarizer having the lower degree of polarization is preferably configured to be adjustable in rotation within a plane orthogonal to an optical axis.

The above and other objects, characteristic features and advantages of the present invention will become apparent to those skilled in the art from the description to be give herein below with reference to the accompanying drawings.

DETAILED DESCRIPTION OF THE PREFERRED EMBODIMENTS

Figure 1:
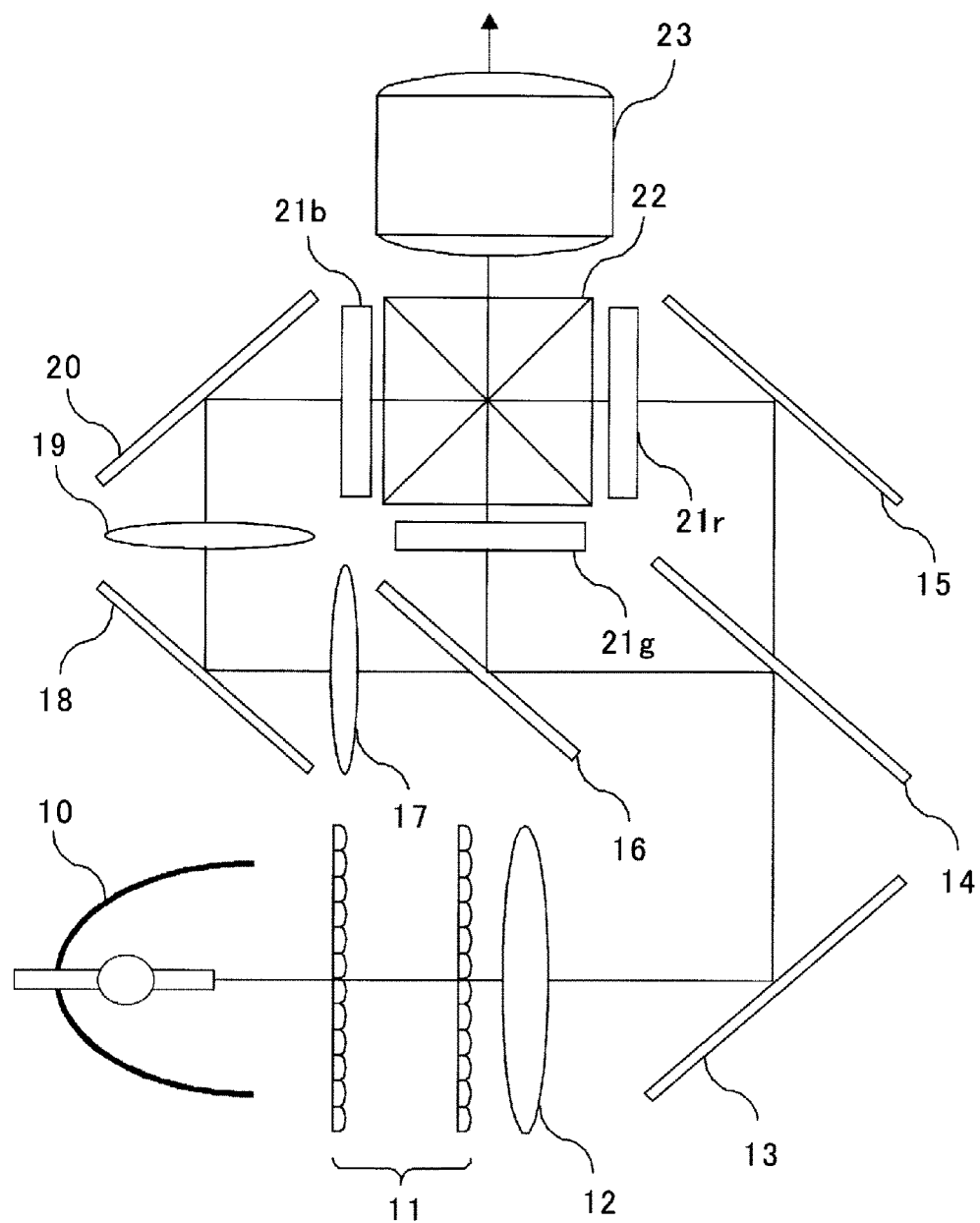
FIG. 1 is a plan view showing an optical system of an embodiment having the present invention applied to a three-panel type liquid crystal projector.

An embodiment having the present invention applied to a liquid crystal projector will be described in detail hereinafter with reference to the accompanying drawings. FIG. 1 is a plan view showing an optical system of a three-plate type liquid crystal projector according to the present embodiment.

A beam of white light emitted from a light source 10, such as a metal halide lamp, passes through an integrator lens 11 and a condenser 12, is then deflected by 90° with a total reflection mirror 13 and guided to a first dichroic mirror 14.

The integrator lens 11 comprises a pair of lenses, is designed so that light may be irradiated via the respective lenses over the entire surface of an LCD panel to be described later, and averages a partial variation in brightness existing in the light emitted from the light source 10 to reduce the difference in light quantity between the center of a screen and the periphery thereof.

The first dichroic mirror 14 permits transmission of light having a wavelength in the red band and reflects light having a wavelength in the cyan (green+blue) band. The light in the red band that has passed through the first dichroic mirror 14 is deflected by a total reflection mirror 15, guided to an LCD unit 21r comprising a transmissive LCD panel for red light band and a polarizer and light-modulated there based on picture signals.

On the other hand, the light in the cyan band deflected by the first dichroic mirror 14 is guided to a second dichroic mirror 16. The second dichroic mirror 16 allows transmission of light having a wavelength in the blue band and reflects light having a wavelength in the green band. The light in the green band deflected by the second dichroic mirror 16 is guided to an LCD unit 21g comprising a transmissive LCD panel for green light and a polarizer and light-modulated there based on picture signals.

Further, the light in the blue band that has passed through the second dichroic mirror 16 is guided via relay lenses 17 and 19 and total reflection mirrors 18 and 20 to an LCD unit 21b comprising a transmissive LCD panel for blue light and a polarizer and light-modulated there based on picture signals.

The modulated beams of light (each color picture beam of light) obtained through the LCD units 21r, 21g and 21b are synthesized by a dichroic prism 22 into color picture light. The color picture light is extendedly projected by a projection lens 23 and displayed by projection on a screen (not shown).

Figure 2A:
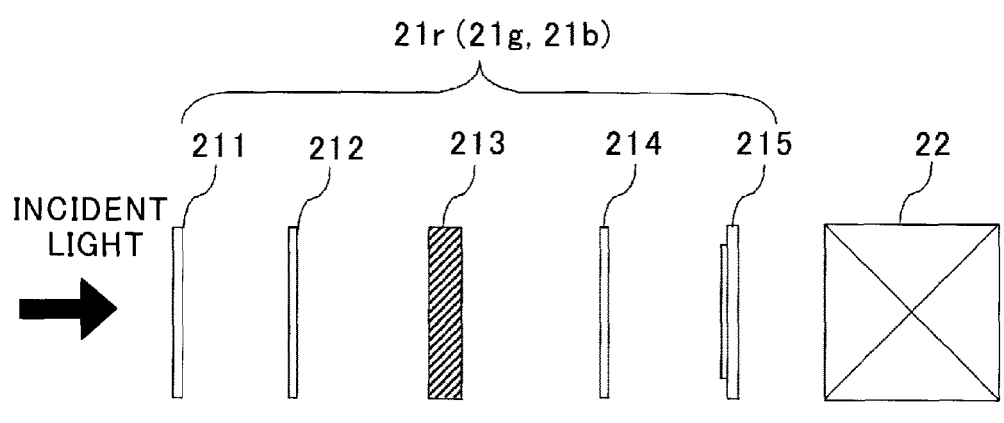
FIG. 2A is a diagram showing the configuration of an LCD unit shown in FIG. 1.
Figure 2B:
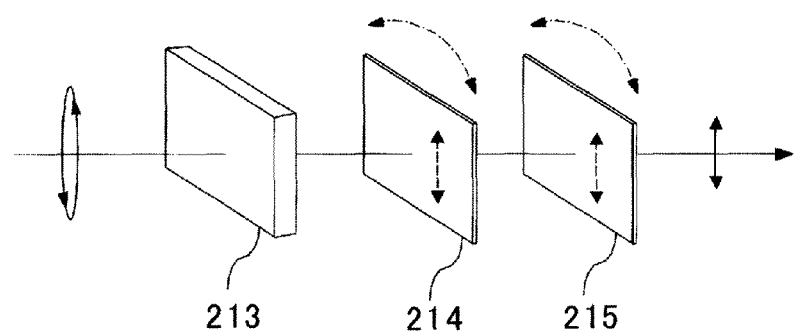
FIG. 2B is an explanatory view showing a beam of light having undergone polarization while traveling from an LCD panel to an absorptive polarizer having a low degree of polarization via an inorganic polarizer having a high degree of polarization.
Figure 3:
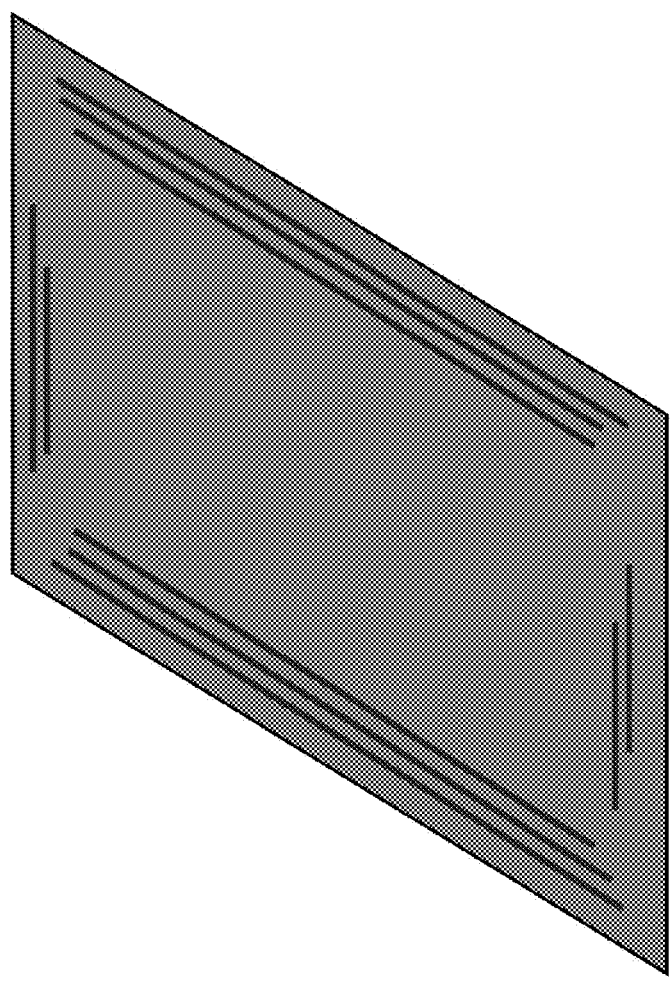
FIG. 3 is an explanatory view showing irregular linear patterns appearing on a display screen due to multiple reflection of light within an optical system.

FIG. 2A is a diagram showing the configuration of each of the LCD units 21r, 21g and 21b, and FIG. 2B is an explanatory view showing a beam of light having undergone polarization while traveling from an LCD panel to an absorptive polarizer having a low degree of polarization via an inorganic polarizer having a degree of polarization higher than that of the absorptive polarizer. In FIG. 2B, vertical arrows shown by a solid line indicate light polarization directions, and arrows shown by dotted lines indicate the direction of a light transmission axis.

As shown in FIG. 2A, each of the LCD units 21r, 21g and 21b comprises a reflective polarizer 211 disposed on the light-incidence side, an optical compensator 212, an LCD panel 213 having liquid crystals sealed between a pair of glass substrates (formed with pixel electrodes and alignment films), an inorganic polarizer 214 having a high degree of polarization and disposed on the light-emission side and an absorptive polarizer 215 having a degree of polarization lower than that of the inorganic polarizer 214.

The reflective polarizer 211 allows transmission of straight polarized light (necessary polarized light) having its light transmission axis direction coincident with a vibration direction, of unpolarized light incident on the reflective polarizer, and reflects almost all straight polarized light (unwanted light) having its light transmission axis direction orthogonal to a vibration direction. This reflective (inorganic) polarizer 211 is used with the principal aim of attaining a longer operating life and may be of a wire grid or photonic crystal type.

The inorganic polarizer 214 having a high degree of polarization and disposed on the light-emission side is used similarly with the principal aim of attaining a longer operating life. Here, though the wire-grid inorganic polarizer provided with the light-absorbing layer as disclosed in JP-A 2008-102416, for example, can be used, an absorptive inorganic polarizer having metallic microparticles formed as dispersed in glass may be used. Thus, by using the absorptive polarizer as the inorganic polarizer 214 having the high degree of polarization, since the inorganic polarizer 214 absorbs unwanted reflected light, picture quality degradation due to multiple reflection of unwanted light between the metal thin film incorporated into the LED panel 213 to form a black matrix and the inorganic polarizer 214 is eliminated.

In the meantime, assuming that a ratio (Tp/Tc) of parallel transmittance (Tp) of a polarizer to cross transmittance (Tc) thereof indicates "contrast of the polarizer" (different from set contrast of a projector), while an ordinary dye polarizer has a ratio of 5000:1 or more, almost all inorganic polarizers have a ratio of around 2000:1 that is lower in degree of polarization than the ratio of the ordinary dye polarizer. Though the inorganic polarizer having such a characteristic can be used for a LOW END model (set contrast≈less than 1000:1), it lacks in performance for a HIGH END model (set contrast≈2000:1 or more). In addition, since "an absorptive polarizer having a low degree of polarization" described below has a ratio Tp/Tc≈2 to 20, it cannot be used by itself. Therefore, "the inorganic polarizer having the high degree of polarization" described above means "a polarizer having a lower degree of polarization than the ordinary dye polarizer, but a relatively high degree of polarization".

On the other hand, the absorptive polarizer 215 lower in degree of polarization than the inorganic polarizer 214 is used for the purpose of compensating for (enhancing) contrast and absorbing unwanted reflected light to enhance the sharpness of the picture to be displayed, thereby absorbing unwanted polarized light and allowing transmission of necessary polarized light. At this time, even when an ordinary dye (organic) polarizer has been used, since unwanted polarized light is absorbed to suppress as much as possible heat to be generated, the degree of polarization of the absorptive polarizer 215 is made lower than that of the inorganic polarizer 214. This can be realized by controlling the content of a dye when the absorptive polarizer 215 is a dye polarizer, for example. Thus, by using the ordinary dye (organic) polarizer as the absorptive polarizer 215 having the low degree of polarization, it is possible to make the mass productivity more excellent and the part costs more inexpensive. Incidentally, the organic polarizer may be of an iodine type besides the dye type.

In the meanwhile, why the absorptive polarizer 215 having the lower degree of polarization than the inorganic polarizer 214 is used is for the purpose of preventing temperature elevation that is an acceleration trigger of degradation of the absorptive polarizer 215. However, an absorptive inorganic polarizer having metallic microparticles dispersed in glass may be used, for example. Thus, by using the inorganic polarizer as the absorptive polarizer 215 having the low degree of polarization, it is possible to make the heat resistance more excellent and the part lifetime longer.

In addition, the optical compensator 212 is used with the aim of compensating for liquid crystal birefringence to enhance the contrast and eliminate irregular black display patterns.

The light transmission axes of the inorganic polarizer 214 and absorptive polarizer 215 are set to be in alignment with and in parallel to each other. When these light transmission axes have been set to be out of alignment, it is impossible to obtain sufficient display performance. Therefore, in a second embodiment to be described later, a rotation-adjusting mechanism (not shown) is used to adjust the rotation of the polarizers in the directions indicated by arrows shown by alternate long and short dash lines in FIG. 2B, thereby setting the light transmission axes to be in alignment with each other.

As described above, a good degree of polarization cannot be expected relative to the inorganic polarizer 214. However, since the straight polarized light that have passed through the inorganic polarizer 214 is allowed to pass through the absorptive polarizer 215 to heighten its degree of polarization, it becomes possible to acquire sufficient contrast in the projected image (the contrast depends on a product of the degrees of polarization of the two polarizers.).

As a result, the straight polarized light is absorbed by the absorptive polarizer 215. Since the straight polarized light having a vibration direction perpendicular to the light transmission axis is almost absorbed beforehand by the inorganic polarizer 214, the absorptive polarizer 215 merely absorbs a slight amount of light. That is to say, even when the amount of light incident on the absorptive polarizer 215 is increased, since the incident light is almost the light passing through the absorptive polarizer 215 and therefore since the amount of the light absorbed is slight, the temperature elevation of the absorptive polarizer 215 can be much suppressed as compared with the conventional case where only the organic polarizer is installed. Incidentally, the temperature of the inorganic polarizer 214 having absorbed in advance the straight polarized light having the vibration direction perpendicular to the light transmission axis in the almost amount is elevated. However, while an ordinary organic polarizer is used at a temperature of 80° C. or less, the inorganic polarizer can be used at a temperature of around 200° C. without entailing any problem.

Next, actual experimental results will be described hereinafter.

In the case where only the absorptive inorganic polarizer 214 was disposed on the light-emission side of the LCD panel 213, for example, the contrast ratio was about 900:1. Next, in the case where the absorptive polarizer 215 having a transmittance of 40% in an absorption-axis direction (Tp≈95%, Tc≈40% and polarizer contrast ratio: 2.4:1) was disposed on the light-emission side of the absorptive inorganic polarizer 214, the contrast ratio was increased up to about 1100:1. Furthermore, though not shown, the irregular linear patterns that had appeared in the display screen or on the periphery thereof were eliminated.

The second embodiment of the present invention will next be described.

In the second embodiment, an optical compensator 212 is disposed similarly to the configuration of the optical system in the first embodiment shown in FIG. 2A and, as shown in FIG. 2B, the inorganic polarizer 214 disposed on the light-emission side of the LCD panel and the absorptive polarizer 215 are configured so as to be adjustable in rotation within the plane orthogonal to the optical axis using a rotation-adjusting mechanism (not shown), thereby making the light transmission axes (or light absorption axes) thereof adjustable to be completely coincident with each other.

In the same manner as in the experiment of the first embodiment, the absorptive polarizer 215 having the transmittance of 40% in the absorption-axis direction was disposed on the light-emission side of the absorptive inorganic polarizer 215 and the light transmission axes were adjusted to be completely coincident with each other through the rotation adjustment. As a result, the contrast ratio was increased from about 1100:1 up to about 1270:1. Thus, by making the transmission axes coincident with each other through adjustment in rotation of the inorganic polarizer 214 or absorptive polarizer 215, the contrast could further be enhanced.

In the meantime, in the case of the dye (organic) polarizer, a polarizer having a low degree of polarization is generally attached as a pre-polarizer between the LCD panel and the polarizer on the light-emission side in order to alleviate the light quantity burden. At this time, however, the uniformity in a black display is possibly deteriorated due to slight heat contraction even when the optical compensator has been disposed. On the other hand, with respect to the uniformity in the black display in the above embodiment, the uniformity (Δx, Δy) of the (x, y) values in the CIE chromaticity coordinates that are the indices of the uniformity in the screen were (0.021, 0.031) before the installation of the absorptive polarizer 215 having the low degree of polarization and (0.021, 0.028) after the installation thereof. Thus, the results were good without exhibiting a considerable change.

Incidentally, with respect to the rotation adjustment of the polarizers, substantially the same effects can be obtained even when one of the inorganic polarizer 215 and absorptive polarizer 215 is made adjustable in rotation.

In addition, as described in JP-A 2006-39087, the optical compensator may be adjustable in inclination relative to the optical axis. Furthermore, though the optical compensator is disposed only on the light-incidence side of the LCD panel, this is not limitative. For example, two optical compensators may be disposed, one on the light-incident side and the other on the light-emission side. Moreover, the present invention is not limited to the case where each of the LCD units 21r, 21g and 21b is provided with the absorptive polarizer having the low degree of polarization. Any one of the LCD units may be provided with the absorptive polarizer.

Furthermore, the present invention is not limited to the optical system shown in FIG. 1, but is applicable to equipment provided with various kinds of optical systems.

Moreover, the LCD panel may be of a TN (Twisted Nematic)/VA (Vertically Aligned)/IPS (In-Plane-Switching) type or a NW (Normally White)/NB (Normally Black) mode.

What is claimed is:

1. An LCD apparatus comprising:

LCD panels for modulating irradiated light based on picture signals;

a projection lens for extendedly projecting the light modulated by the LCD panels;

a light source for emitting light to irradiate the LCD panels;

an inorganic polarizer having a relatively higher degree of polarization and disposed on a light-emission side of each of the LCD panels; and an absorptive polarizer having a lower degree of polarization than the inorganic polarizer and disposed on a light-emission side of the inorganic polarizer;

wherein the inorganic polarizer having the higher degree of polarization and the absorptive polarizer having the lower degree of polarization have respective light transmission axes coincident with each other.

2. An LCD apparatus according to claim 1, wherein the inorganic polarizer having the higher degree of polarization comprises an absorptive polarizer.

3. An LCD apparatus according to claim 1, wherein the absorptive polarizer having the lower degree of polarization is made of an inorganic substance.

4. An LCD apparatus according to claim 1, wherein the absorptive polarizer having the lower degree of polarization is made of an organic substance.

5. An LCD apparatus according to claim 1, wherein at least one of the inorganic polarizer having the higher degree of polarization and the absorptive polarizer having the lower degree of polarization is adjustable in rotation within a plane orthogonal to an optical axis.

6. An LCD apparatus according to claim 2, wherein at least one of the inorganic polarizer having the higher degree of polarization and the absorptive polarizer having the lower degree of polarization is adjustable in rotation within a plane orthogonal to an optical axis.

7. An LCD apparatus according to claim 3, wherein at least one of the inorganic polarizer having the higher degree of polarization and the absorptive polarizer having the lower degree of polarization is adjustable in rotation within a plane orthogonal to an optical axis.

8. An LCD apparatus according to claim 4, wherein at least one of the inorganic polarizer having the higher degree of polarization and the absorptive polarizer having the lower degree of polarization is adjustable in rotation within a plane orthogonal to an optical axis.

* * * * *